United States Patent
Kotani

(10) Patent No.: US 7,116,431 B2
(45) Date of Patent: Oct. 3, 2006

(54) IMAGE FORMING APPARATUS

(75) Inventor: Masaki Kotani, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 911 days.

(21) Appl. No.: 09/837,713

(22) Filed: Apr. 17, 2001

(65) Prior Publication Data

US 2001/0033388 A1  Oct. 25, 2001

(30) Foreign Application Priority Data

Apr. 25, 2000 (JP) .............................. 2000-124335

(51) Int. Cl.
*G06F 15/00* (2006.01)
(52) U.S. Cl. ...................... 358/1.12; 358/1.1
(58) Field of Classification Search ............ 358/1.12, 358/448–451, 1.1; 399/370, 376
See application file for complete search history.

(56) References Cited

U.S. PATENT DOCUMENTS

| 4,947,206 A | | 8/1990 | Ito ................................ 355/55 |
| 5,959,742 A | * | 9/1999 | Momose et al. ............. 358/449 |
| 6,628,417 B1 | * | 9/2003 | Naito et al. ................. 358/1.15 |

FOREIGN PATENT DOCUMENTS

| EP | 0-889637 | | 1/1999 |
| EP | 0-949590 | | 10/1999 |
| JP | 05-124295 | | 5/1993 |
| JP | 08-163285 | | 6/1996 |
| JP | 08-167968 | | 6/1996 |
| JP | 11150624 A | * | 2/1999 |
| JP | 11-150624 | | 6/1999 |
| JP | 11-341261 | | 12/1999 |
| WO | 86/03851 | | 7/1986 |

* cited by examiner

*Primary Examiner*—Gabriel Garcia
(74) *Attorney, Agent, or Firm*—Hogan & Hartson LLP

(57) ABSTRACT

An image forming machine (1) that can select a most appropriate recording sheet. The image forming machine (1) may be a facsimile machine having a photocopy function. The facsimile machine has a 100% magnification preferred mode and a one-page-printing preferred mode. In the latter mode, an image may be reduced for printing, or two images may be combined and printed on a single sheet of paper. ROM (30) stores a plurality of print types in a predetermined order for each of these modes (PT1, PT2). The facsimile machine (1) has a plurality of paper cassettes (51, 52, 53) to store recording sheets. A controller (10) selects one of the paper cassettes which best suits for the printing under a predetermined criterion, and causes a printer (50) to print the image on one or more recording sheets supplied from the selected paper cassette.

23 Claims, 13 Drawing Sheets

JUST-1-PAGE

JUST-HALF-PAGE

SEMI-JUST-1-PAGE

SEMI-JUST-HALF-PAGE

FIG. 3A
HALF-PAGE
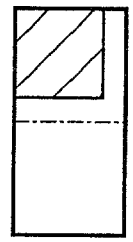 OR 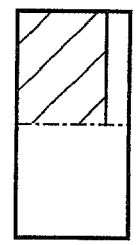
FIG. 3B
1-PAGE
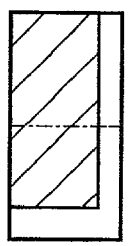 OR 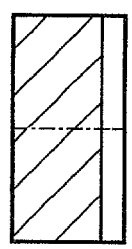
FIG. 3C
LONG-PAGE
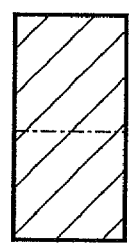 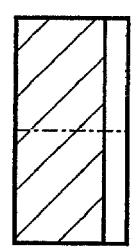
OR
 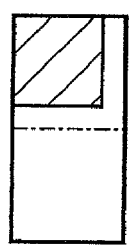

REDUCED-HAFL-PAGE

OR

REDUCED-PAGE

FIG. 6A

100% MAGNIFICATION PREFERRED MODE

PT1:
- HIGH
- JUST-1-PAGE
- JUST-HALF-PAGE
- SEMI-JUST-HALF-PAGE
- SEMI-JUST-1-PAGE
- HALF-PAGE
- 1-PAGE
- LONG-PAGE
- REDUCED-JUST-1-PAGE
- REDUCED-1-PAGE
- REDUCED-JUST-HALF-PAGE
- REDUCED-HALF-PAGE
- REDUCED-PAGE
- LOW

FIG. 6B

ONE PAGE PREFERRED MODE

PT2:
- HIGH
- JUST-1-PAGE
- JUST-HALF-PAGE
- REDUCED-JUST-1-PAGE
- SEMI-JUST-HALF-PAGE
- SEMI-JUST-1-PAGE
- HALF-PAGE
- 1-PAGE
- REDUCED-1-PAGE
- REDUCED-JUST-HALF-PAGE
- REDUCED-HALF-PAGE
- LONG-PAGE
- REDUCED-PAGE
- LOW

FIG. 7

TABLE T

| | TENTATIVE PRINT TYPE | COMPARATIVE PRINT TYPE |
|---|---|---|
| A | SEMI-JUST-HALF-PAGE | SEMI-JUST-1-PAGE |
| B | SEMI-JUST-1-PAGE | 1-PAGE |
| C | HALF-PAGE | 1-PAGE |
| D | LONG-PAGE | REDUCED-JUST-1-PAGE<br>REDUCED-1-PAGE<br>REDUCED-JUST-HALF-PAGE<br>REDUCED-HALF-PAGE |

FIG.16
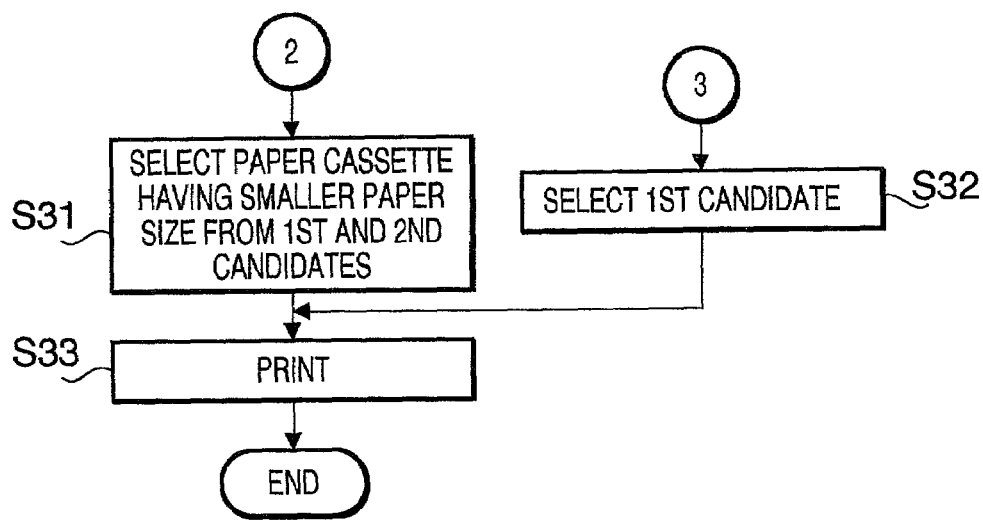
FIG.17A
PRIOR ART
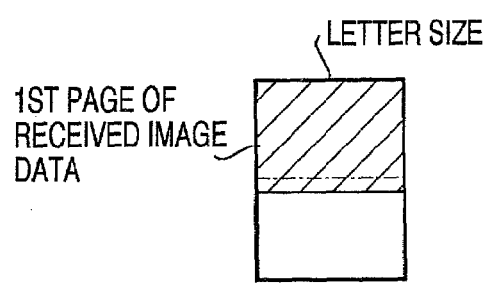
FIG.17B
PRIOR ART
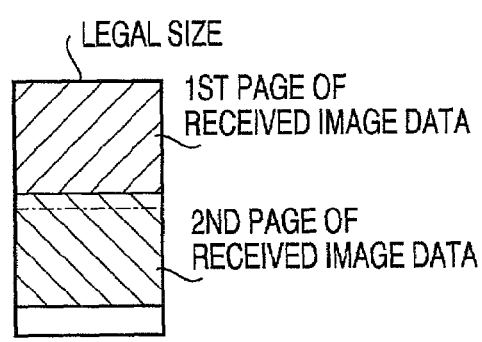
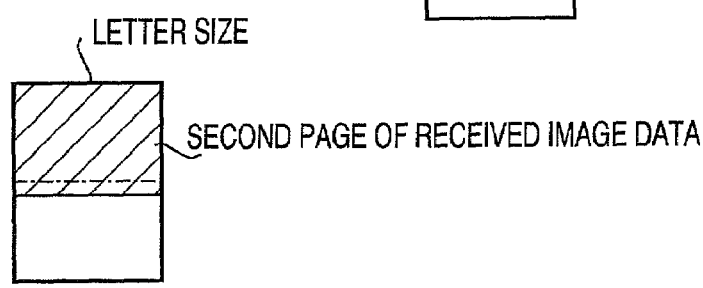

IMAGE FORMING APPARATUS

CROSS REFERENCES TO RELATED APPLICATIONS

This application claims priority under 35 USC 119 of Japanese Patent Application No. 2000-124335 filed in JPO on Apr. 25, 2000, the entire disclosure of which is incorporated herein by reference.

BACKGROUND OF THE INVENTION

1. Field of the Invention

The present invention generally relates to an image forming apparatus that is incorporated in a facsimile machine having no photocopy function, a facsimile machine having a photocopy function and the like, and more particularly to such image forming apparatus that is characterized by its paper selection.

2. Description of the Related Art

An image forming apparatus, which is represented by a facsimile machine having a photocopy function, selects a recording sheet from paper cassettes and prints image data on the selected sheet when making a photocopy or receiving image data from a remote machine. The image forming apparatus selects the sheet in accordance with the size of the image data on an original document or that of the received image data. If a so-called automatic rotation mode, which automatically turns the image data 90 degrees, is turned on, the image forming apparatus also considers the turned image when selecting the recording sheet. Specifically, if image data is printable on a sheet of paper as a result of turning, the image forming apparatus turns the image and prints it.

When the image forming apparatus can synthesize image data of one page with image data of another page and print the synthesized image on a single sheet of paper, i.e., when a page synthesis (or combine) mode is turned on, it does not use two sheets of paper; it combines two-page worth image data and prints it on a single sheet of paper.

Referring to FIG. 17A of the accompanying drawings, it should be assumed here that the image forming apparatus receives two pages of image data, and the length of the image data in each page is greater than the half of the letter size but smaller than the half of the legal size. If a first paper cassette holds sheets of legal size and a second paper cassette holds sheets of letter size, the image forming apparatus selects the second cassette and uses two sheets of letter-size paper to print the two-page worth image data. As a result, an approximate half of each of the letter-size paper is left as a margin (or a white area). This wastes the paper.

Referring to FIG. 17B, let's assume now that the image forming apparatus receives two-page-worth data, of which image data length in each page is shorter than the half letter size. If the first paper cassette holds the legal size paper and the second paper cassette holds the half letter size paper, the received images are combined and printed on a single sheet of legal size paper. Accordingly, a margin is left in the second half of the recording sheet (legal size paper). This also wastes the paper.

SUMMARY OF THE INVENTION

An object of the present invention is to provide an image forming apparatus that can select a most appropriate recording sheet.

According to one aspect of the present invention, there is provided an image forming apparatus for printing one or two images on one or more recording sheets supplied from a particular paper cassette, including a plurality of paper cassettes for storing recording sheets respectively, at least one first memory table for memorizing a plurality of print types in a predetermined order from a highest priority to a lowest priority, a second memory table for memorizing a plurality of comparative print types which are to be compared with the plurality of print types respectively, and a controller for selecting a first paper cassette that stores recording sheets suited to print an image and has a print type of possible highest priority in the respective first memory table, for selecting a second paper cassette that stores recording sheets suited to print the image and has a comparative print type to be compared with the print type of the first paper cassette in the second memory table, and for selecting one of the first and second paper cassettes based on a predetermined criterion as an ultimate paper cassette. The image forming apparatus may further include a printer for printing the image on one or more recording sheets supplied from the ultimate paper cassette.

The above mentioned at least one first memory table may include a memory table prepared for a first printing mode adapted to preferably print the image at 100% magnification and another memory table prepared for a second printing mode adapted to preferably print the image on a single recording sheet. In the second printing mode, the image may be reduced for printing and/or two images may be combined and printed on a single recording sheet.

The predetermined criterion may be selecting a paper cassette that stores recording sheets of smaller size.

If there are more than one first paper cassette, the controller may select one among them that can print the image at a reduction ratio closest to 100%. Likewise, if there are more than one second paper cassette, the controller may select one that can print the image at a reduction ratio closest to 100%.

If the reduction ratios of the respective first paper cassettes are the same, the controller may select a paper cassette that stores recording sheets of smallest size. If the reduction ratios of the respective second paper cassettes are the same, the controller may select a paper cassette that stores recording sheets of smallest size.

If the paper sizes of the respective first paper cassettes are the same, the controller may select a paper cassette that can print the image without turning the image. If the paper sizes of the respective second paper cassettes are the same, the controller may select a paper cassette that can print the image without turning.

The controller may select a paper cassette that leaves a smallest margin on the recording sheet upon printing the image when it selects the first and second paper cassettes from the first and second memory tables respectively.

If there are more than one first paper cassette, the controller may select a paper cassette that stores recording sheets of smallest width. If there are more than one second paper cassette, the controller may select one that stores recording sheets of smallest width.

If there are more than one first paper cassette, the controller may select a paper cassette that can print the image in a single recording sheet even if a 100% magnification preferred mode is selected. If there are more than one second paper cassette, the controller may select a paper cassette that can print the image in a single recording sheet even if a 100% magnification preferred mode is selected.

If there is no comparative print type in the second memory table, the controller selects the first paper cassette as the ultimate paper cassette.

According to another aspect of the present invention, there is provided a method for printing an image on one or more recording sheets supplied from a particular paper cassette including the steps of providing a plurality of paper cassettes to store recording sheets, providing at least one first memory table to memorize a plurality of print types from a highest priority to a lowest priority, providing a second memory table to memorize a plurality of comparative print types, selecting a first paper cassette that stores recording sheets suited to print an image and has a print type of possible highest priority in the respective first memory table, selecting a second paper cassette that stores recording sheets suited to print the image and has a comparative print type to be compared with the print type of the first paper cassette in the second memory table, selecting one of the first and second paper cassettes based on a predetermined criterion as an ultimate paper cassette, and printing the image on one or more recording sheets supplied from the ultimate paper cassette.

Additional objects, benefits, aspects and advantages of the present invention will become apparent to those skilled in the art to which the present invention pertains from the subsequent detailed description and the appended claims, taken in conjunction with the accompanying drawings.

BRIEF DESCRIPTION OF THE SEVERAL VIEWS OF THE DRAWINGS

FIG. 3A illustrates a print type "HALF-PAGE";
FIG. 3B illustrates a print type "1-PAGE";
FIG. 3C illustrates a print type "LONG-PAGE";
FIG. 6A illustrates the order of priority with respect to the print type in a 100% magnification preferred mode;
FIG. 6B illustrates the order of priority in a one-page-printing preferred mode;
FIG. 7 illustrates a consideration table;
FIGS. 14 through 16 in combination illustrate a flowchart to select a paper cassette to be utilized for printing the image data, and specifically
FIG. 14 illustrates a flowchart segment for deciding a first cassette candidate,
FIG. 15 illustrates a flowchart segment for deciding a second cassette candidate,
and FIG. 16 illustrates a flowchart segment for selecting one of the first and second candidates as an ultimate cassette;
FIG. 17A illustrates when the image data is printed on the letter size paper according to a conventional technique;
and
FIG. 17B illustrates when the image data is printed on the legal size paper according to the conventional technique.

DETAILED DESCRIPTION OF THE INVENTION

Embodiments of the present invention will now be described in reference to the accompanying drawings. A facsimile machine having a photocopy function is taken as an example of image forming apparatus of the invention in the following description.

Figure 1:
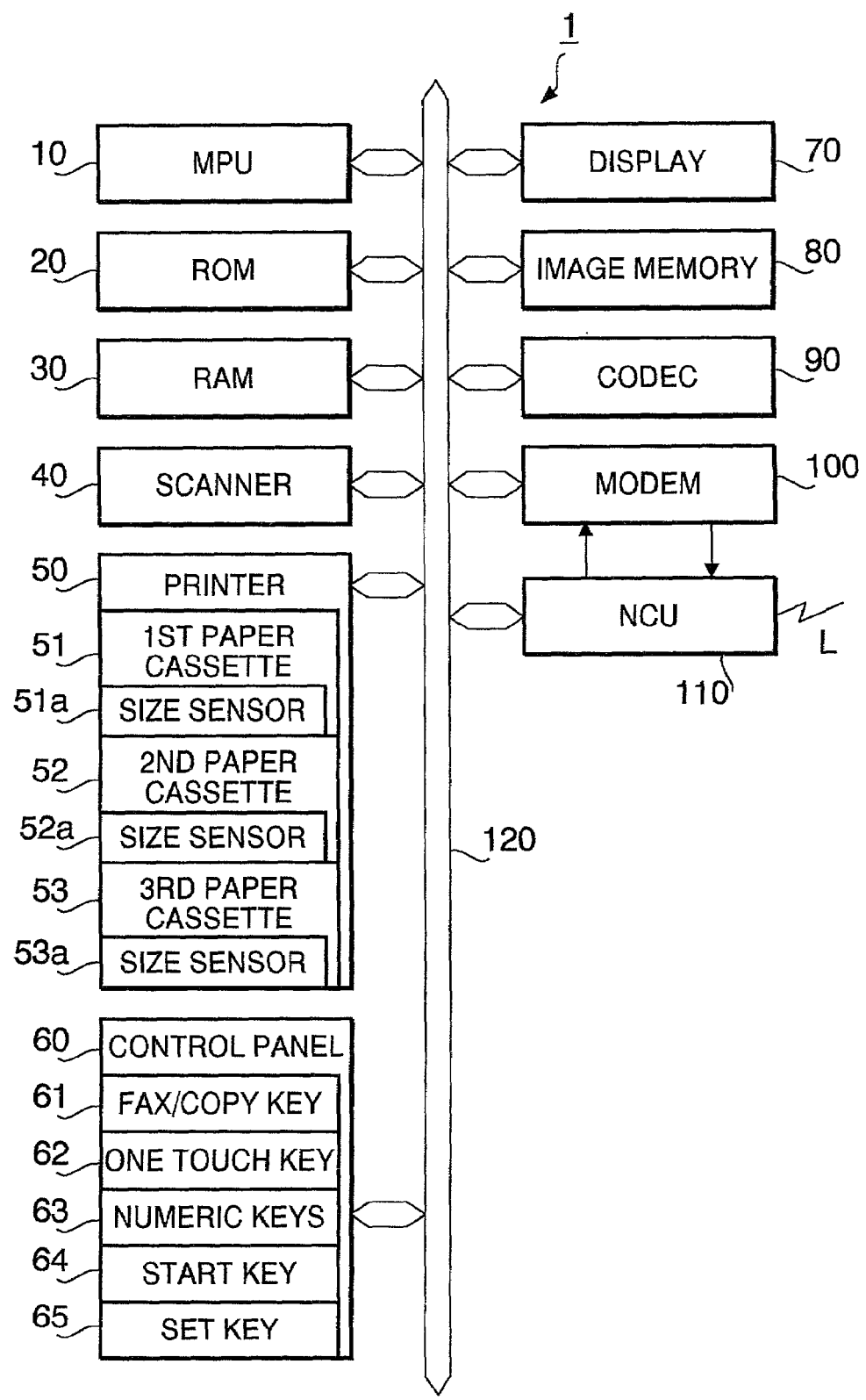
FIG. 1 is a block diagram showing a structure of facsimile machine having a photocopy function according to the present invention.

General Structure:

Referring to FIG. 1, a facsimile machine having a photocopy function 1 includes MPU 10, ROM 20, RAM 30, scanner 40, recorder (printer) 50, operation panel (control panel) 60, display 70, image memory 80, codec 90, modem 100 and NCU 110. These hardware elements are connected to each other by a bus 120.

MPU 10 controls the hardware elements of the facsimile machine 1. ROM 20 stores programs needed to control the facsimile machine 1. RAM 30 temporarily stores various information related to the facsimile machine 1.

The scanner 40 reads image data on an original document and outputs black-white binary image data. The printer 50 is a photographic printer and prints image data received from a remote facsimile machine or the like and that scanned by the scanner 40 during the copy operation on a recording sheet. The printer 50 includes a first paper cassette 51 located in an upper area of a facsimile machine frame, a second paper cassette 52 in an intermediate area, and a third paper cassette 53 in a lower area. The first to third paper cassettes 51 to 53 are equipped with size sensors 51a to 53a to detect paper sizes respectively. When recording sheets are loaded into the first to third paper cassettes 51 to 53, the size sensors 51a to 53a detect the sheet sizes. Detection signals are sent to MPU 10 from the paper size sensors.

The operation panel 60 has a fax/copy key 61 to select a fax or copy mode, a one touch speed dial key 62 to allow an operator to select (or dial) a registered facsimile number by simply touching the key, numeric keys 63 including 0 to 9 as well as * and # for inputting a telephone number or the number of copy, a start key 64 for starting a scanning operation, etc. Further, the operation panel 60 has another mode selection key 65 for selecting one of an automatic rotation mode which automatically turns image data, a page synthesis mode for combining two pages of image data and printing it on a single recording sheet, and a 100% magnification preference mode for prioritizing printing of image data at 100% magnification or a one page preference mode for prioritizing printing of image data on a single sheet of paper.

The display 70 includes LCD to display various information such as operating conditions of the facsimile machine 1.

The image memory 80 temporarily stores image data received from a remote machine and scanned by the scanner 40. The codec 90 encodes image data scanned by the scanner 40 by MH, MR or MMR method for image data transmission. The codec 90 also decodes received image data.

The modem 100 modulates and demodulates data received and to be sent, according to V.17, V.27ter or V.29 defined in the facsimile data transmission control procedures in ITU-T Recommendations T.30. NCU 10 controls connection to a telephone line L, and detects transmission and reception of a dialing signal corresponding to a telephone number (or fax number) of a remote party.

It should be noted that MPU 10, ROM 20 and RAM 30 constitute in combination a controller in the claims.

Print Types:

Next, various print types will be described in reference to FIGS. 2A through 5B. The print types are categorized as shown below based on how image data is printed on a recording sheet when the image data size is reduced (less than 100% magnification) or not reduced (100% magnification).

(1) JUST-1-PAGE

Figure 2A:
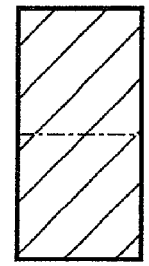
FIG. 2A illustrates a print type "JUST-1-PAGE"

As shown in FIG. 2A, it refers to a case where the length and width of one page of image data match those of a recording sheet when one page of image data is printed at 100% magnification. The single-dot chain-line indicates the center of the sheet, and the shading indicates the image data.

(2) JUST-HALF-PAGE

Figure 2B:
FIG. 2B illustrates a print type "JUST-HALF-PAGE"

As illustrated in FIG. 2B, one page of image data is printed on a recording sheet at 100% magnification, the width of the image data is equal to that of the recording sheet and the length of the image data is a half of the recording sheet in this print type.

(3) SEMI-JUST-1-PAGE

Figure 2C:
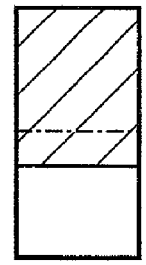
FIG. 2C illustrates a print type "SEMI-JUST -1-PAGE"

As shown in FIG. 2C, one page of image data is printed on a recording sheet at 100% magnification, the width of the image data is equal to the recording sheet and the length of the image data is greater than a half of the recording sheet length but smaller than the two halves.

(4) SEMI-JUST-HALF-PAGE

Figure 2D:
FIG. 2D illustrates a print type "SEMI-JUST-HALF-PAGE"

As shown in FIG. 2D, one page of image data is printed on a recording sheet at 100% magnification, the width of the image data matches to the recording sheet and the length of the image data is smaller than the half of the recording sheet.

(5) HALF-PAGE

As shown in FIG. 3A, if one page of image data is printed on a recording sheet at 100% magnification, the width of the image data is smaller than the recording sheet and the length of the image data is less than the half of the recording sheet.

(6) 1-PAGE

As shown in FIG. 3B, if one page of image data is printed on a recording sheet at 100% magnification, the width of the image data is smaller than the recording sheet and the length of the image data is between one and two halves of the recording sheet length.

(7) LONG-PAGE

As shown in FIG. 3C, if one page of image data is printed at 100% magnification, the image data spans a plurality of recording sheets.

(8) REDUCED-JUST-1-PAGE

Figure 4A:
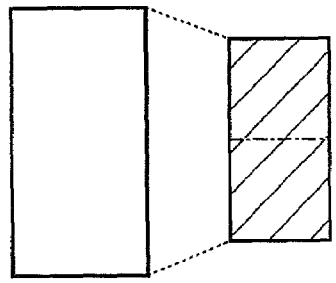
FIG. 4A illustrates a print type "REDUCED-JUST-1-PAGE"

As depicted in FIG. 4A, if one page of image data is printed on a recording sheet at less than 100% magnification, the width and length of the image data match those of the recording sheet.

(9) REDUCED-1-PAGE

Figure 4B:
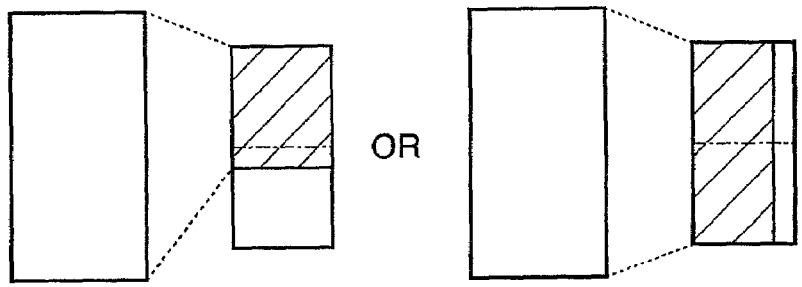
FIG. 4B illustrates a print type "REDUCED-1-PAGE"

As depicted in FIG. 4B, if one page of image data is reduced and printed on a recording sheet, both the width and length of the image data are smaller than the recording sheet.

(10) REDUCED-JUST-HALF-PAGE

Figure 4C:
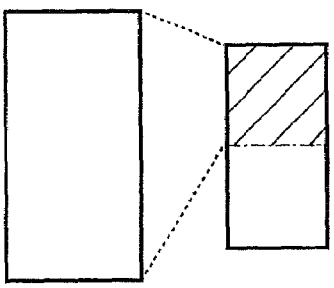
FIG. 4C illustrates a print type "REDUCED-JUST-HALF-PAGE"

As depicted in FIG. 4C, if one page of image data is reduced and printed on a recording sheet, the width of the image data is equal to the recording sheet and the length of the image data is smaller than the half of the recording sheet.

(11) REDUCED-HALF-PAGE

Figure 5A:
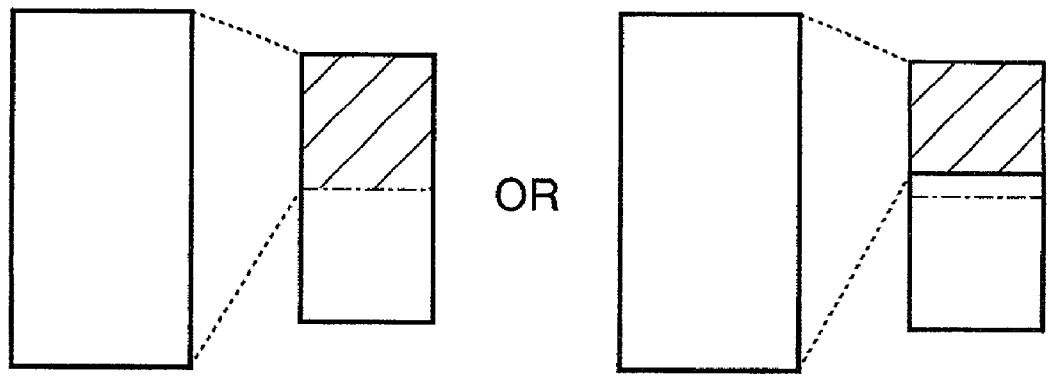
FIG. 5A illustrates a print type "REDUCED-HALF-PAGE"

As shown in FIG. 5A, if one page of image data is reduced and printed on a recording sheet, the width of the image data are smaller than the recording sheet and the length of the image data is smaller than the half of the recording sheet.

(12) REDUCED-PAGE

Figure 5B:
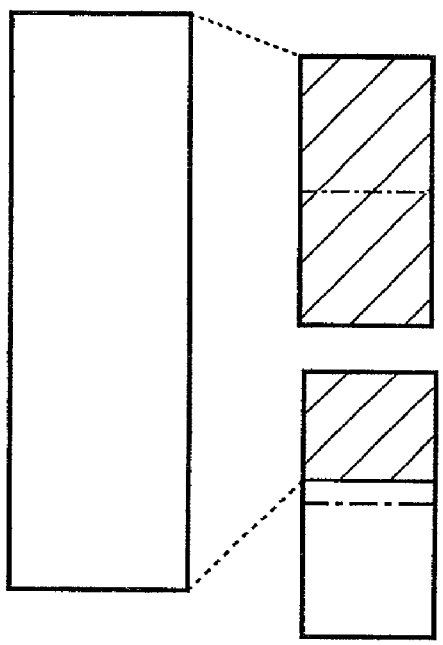
FIG. 5B illustrates a print type "REDUCED-A PAGE"

As shown in FIG. 5B, if one page of image data is reduced and printed, the image data spans a plurality of recording sheets.

Order of Preference:

Now, a mode for giving priority to 100% magnification printing and a mode for giving priority to one page printing will be described in reference to FIGS. 6A and 6B. Specifically, the order of priority with respect to the print types in each of these modes will be described.

(1) 100% Magnification Preferred Mode

As illustrated in a first table of print types PT1 of FIG. 6A, the order of priority of the paper cassettes based on the print type is determined in the terms of "paper width", "100% magnification", and "reduction" from the highest priority if the 100% magnification preferred mode is selected.

(2) One Page Preferred Mode

As illustrated in a second print type table PT2 of FIG. 6B, the order of priority of the paper cassettes based on the print type is determined in the terms of "paper width", "reduction" and "100% magnification" from the highest priority if the one page preferred mode is selected.

Consideration Table:

Referring to FIGS. 7 to 13B, necessity of a consideration table T shown in FIG. 7 will be discussed.

(A) SEMI-JUST-HALF-PAGE VS. SEMI-JUST-1-PAGE

As precondition, the automatic turn mode is turned on or off, and the page synthesis mode is on.

Figure 8A:
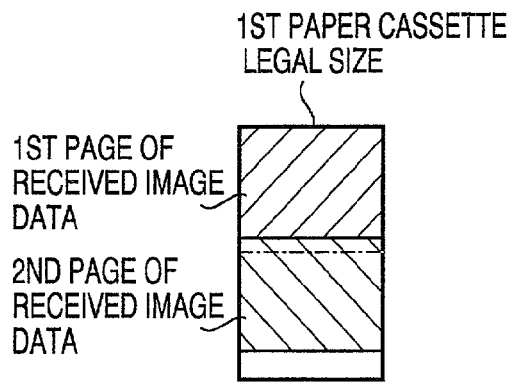
FIG. 8A illustrates when image data is printed on legal size paper.
Figure 8B:
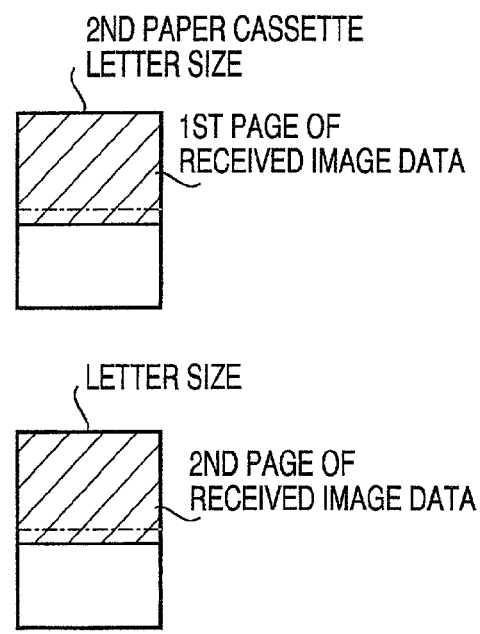
FIG. 8B illustrates when the image data is printed on letter size paper.

(A-1) As illustrated in FIGS. 8A and 8B, let's assume here that two pages of image data are received, and the width of each page of image data is equal to a short side of the legal size (letter size), and the length of each page of image data is longer than the half of the letter size length but shorter than the half of the legal size length.

In this instance, if the first paper cassette holds sheets of legal size and the second paper cassette holds sheets of letter size, the print type of the first paper cassette is "SEMI-JUST-HALF-PAGE" and that of the second paper cassette is "SEMI-JUST-1-PAGE".

As shown in FIG. 8A, when the first paper cassette is selected, the two pages of image data are combined with each other and printed on a single sheet of legal size since the page synthesis mode is turned on.

On the other hand, when the second paper cassette is selected as shown in FIG. 8B, the two pages of image data are printed on two sheets of letter size.

Here, if the white portion (margin) left in the recording sheet when the image data is printed on the single sheet of legal size is compared with that left when the image data is printed on the two sheets of letter size, the former margin is smaller. In other words, synthesizing the two pages of image data and printing it on single legal size paper result in reduction of wasted paper (or effective use of recording sheets).

Figure 9A:
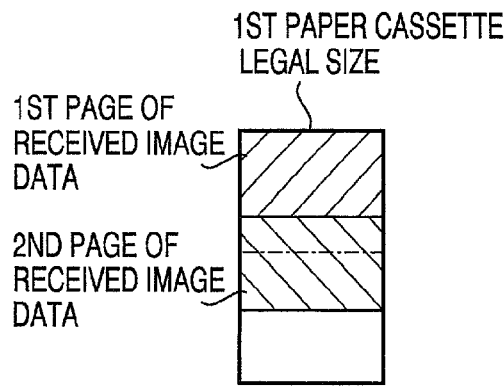
FIG. 9A illustrates when the image data is printed on the legal size paper.
Figure 9B:
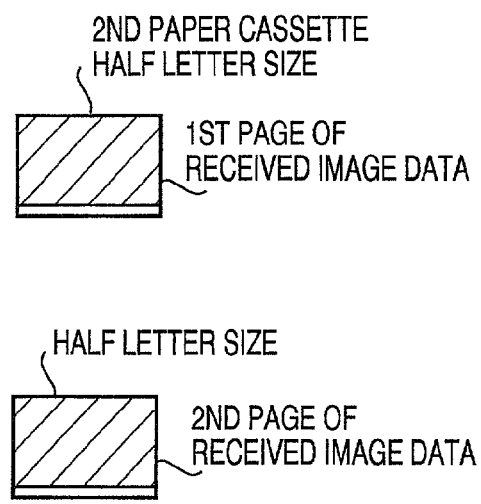
FIG. 9B illustrates when the image data is printed on half letter size paper.

(A-2) Referring to FIGS. 9A and 9B, let's assume that the facsimile machine 1 receives two pages of image data, and the width of each page of image data is equal to the short side of the legal size (letter size) and the length is shorter than the half letter size. It should be noted that the half letter size is sometimes referred to as invoice size.

If the first paper cassette holds sheets of legal size and the second paper cassette holds sheets of half letter size, the print type of the first paper cassette is "SEMI-JUST-HALF-PAGE" and that of the second paper cassette is "SEMI-JUST-1PAGE".

As shown in FIG. 9A, when the first paper cassette is selected, the two pages of image data are combined and printed on a single sheet of legal size since the page synthesis mode is turned on.

On the other hand, when the second paper cassette is selected as shown in FIG. 9B, the two pages of image data are printed on two sheets of half letter size.

If the margin left in the recording sheet when the image data is printed on the single sheet of legal size is compared with that left when the image data is printed on the two sheets of half letter size, the latter margin is smaller. In other words, printing the two pages of image data on the two sheets of half letter size reduces wasted paper.

Therefore, after the print types of all the paper cassettes are decided, the print type "SEMI-JUST-1-PAGE" should be considered if the print type "SEMI-JUST-HALF-PAGE" is available.

(B) SEMI-JUST-1-PAGE VS. 1PAGE

As precondition, the automatic turn mode is turned on, and the page synthesis mode is off.

Figure 10A:
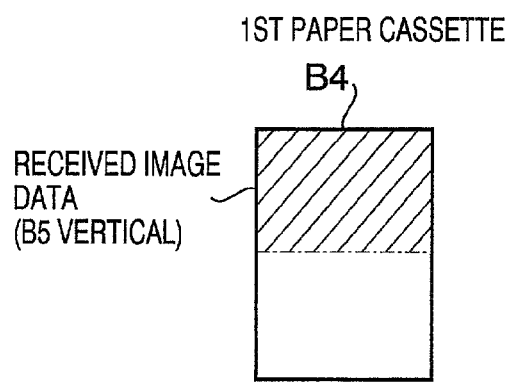
FIG. 10A illustrates when the image data is printed on B4 size paper.
Figure 10B:
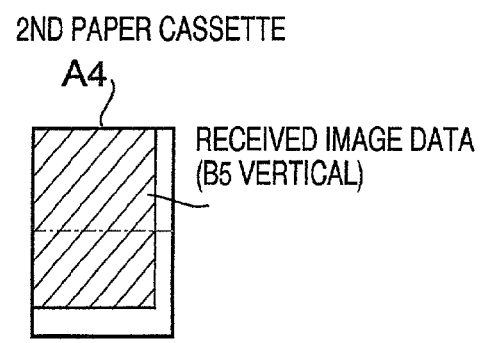
FIG. 10B illustrates when the image data is printed on A4 size paper.

(B-1) As illustrated in FIGS. 10A and 10B, it should be assumed that the facsimile machine 1 receives image data of B5 size lengthwise.

In this instance, if the first paper cassette holds recording sheets of B4 size and the second paper cassette holds sheets of A4 size, the print type of the first paper cassette is "SEMI-JUST-1-PAGE" since the page synthesis mode is turned off, and that of the second paper cassette is "1-PAGE" since the automatic turn mode is turned on.

As shown in FIG. 10A, when the first paper cassette is selected, the image data is printed on a single sheet of B4 size paper.

On the other hand, when the second paper cassette is selected as shown in FIG. 10B, the image data is printed on the A4 size paper.

Here, if the margin left in the recording sheet is compared between when the image data is printed on the B4 size paper and the A4 size paper, the latter is smaller. In other words, use of A4 size paper reduces wasted paper.

Figure 11A:
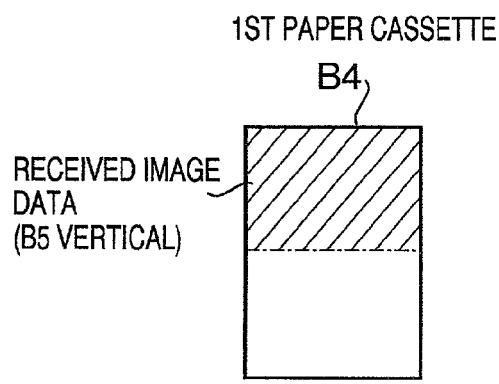
FIG. 11A illustrates when the image data is printed on the B4 size paper.
Figure 11B:
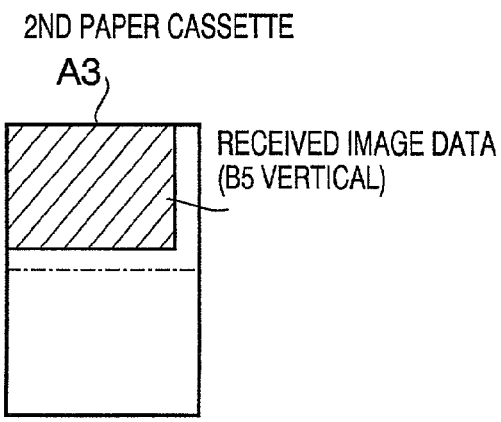
FIG. 11B illustrates when the image data is printed on A3 size paper.

(B-2) Referring to FIGS. 11A and 11B, it should be assumed that the facsimile machine 1 receives image data of B5 size lengthwise.

If the first paper cassette holds sheets of B4 size and the second paper cassette holds sheets of A3 size, the print type of the first paper cassette is "SEMI-JUST-1-PAGE" since the page combination mode is turned off and that of the second paper cassette is "1PAGE" since the automatic turn mode is turned on.

As shown in FIG. 11A, when the first paper cassette is selected, the image data is printed on a sheet of B4 size.

On the other hand, when the second paper cassette is selected as shown in FIG 11B, the image data is printed on a sheet of A3 size.

If the margin left in the recording sheet when the image data is printed on the B4 paper is compared with that left when the image data is printed on the A3 paper, the former has a smaller margin. In other words, printing the image data on the B4 paper reduces wasted paper.

Therefore, after the print types of all the paper cassettes are decided, the print type "1-PAGE" should be considered if the print type "SEMI-JUST-1-PAGE" is available.

(C) HALF-PAGE VS. 1-PAGE

As precondition, the automatic turn mode is turned on, and the page synthesis mode is turned on.

Figure 12A:
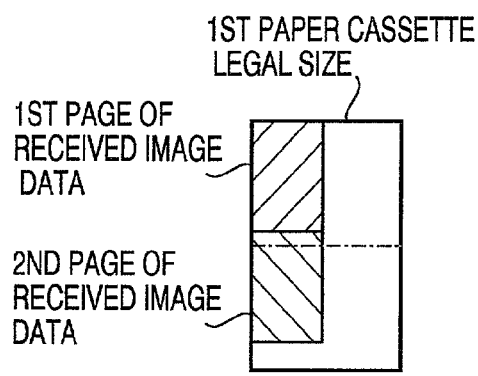
FIG. 12A illustrates when the image data is printed on the legal size paper.
Figure 12B:
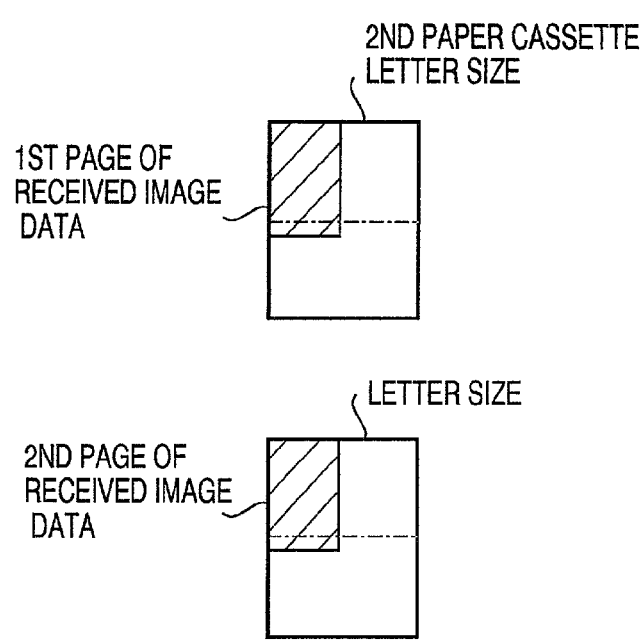
FIG. 12B illustrates when the image data is printed on the letter size paper.

(C-1) As illustrated in FIGS. 12A and 12B, it should be assumed that a reduction ratio is fixedly set to 50, the facsimile machine 1 receives two pages of image data, and the width of the image data in each page is equal to the short side of the legal size (letter size) and the length is longer than the letter size length but shorter than the legal size length.

In this instance, if the first paper cassette holds recording sheets of legal size and the second paper cassette holds sheets of letter size, the print type of the first paper cassette is "HALF-PAGE" and that of the second paper cassette is "1PAGE".

As shown in FIG. 12A, when the first paper cassette is selected, the two pages of image data are combined and printed on a single sheet of legal size since the page synthesis mode is selected.

On the other hand, when the second paper cassette is selected as shown in FIG. 12B, the two pages of image data are printed on two sheets of letter size paper.

Here, if the margin left in the recording sheet is compared between when the image data is printed on the single sheet of legal size paper and when the image data is printed on the two sheets of letter size paper, the former has a smaller margin. In other words, combining two pages of image data and printing it on the single sheet of legal size paper reduces wasted paper.

Figure 13A:
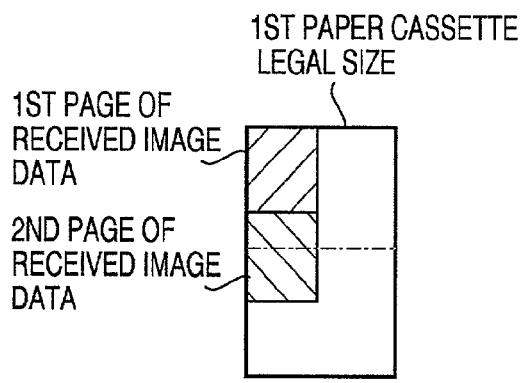
FIG. 13A illustrates when the image data is printed on the legal size paper.
Figure 13B:
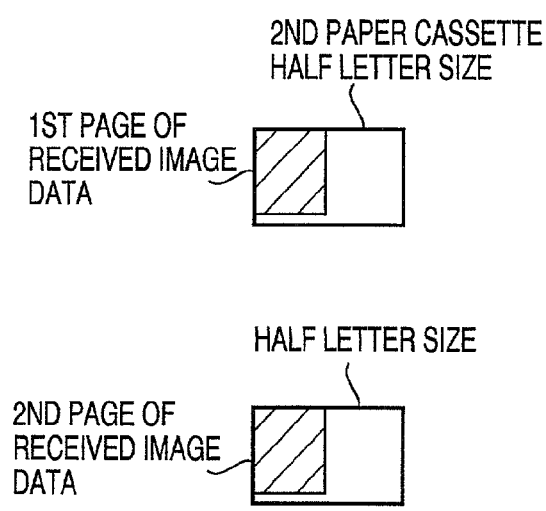
FIG. 13B illustrates when the image data is printed on the half letter size paper.

(C-2) As illustrated in FIGS. 13A and 13B, it should be assumed that a fixed reduction ratio is set to 50%, the facsimile machine 1 receives two pages of image data, and the width of the image data in each page is equal to the short side of the legal size (letter size) and the length of the image data is shorter than the letter size length but longer than the half of the legal size length.

In this instance, if the first paper cassette holds recording sheets of legal size and the second paper cassette holds sheets of half letter size, the print type of the first paper cassette is "HALF-PAGE" and that of the second paper cassette is "1-PAGE".

As shown in FIG. 13A, when the first paper cassette is selected, the two pages of image data are combined and printed on a single sheet of legal size since the page synthesis mode is selected.

On the other hand, when the second paper cassette is selected as shown in FIG. 13B, the two pages of image data are printed on two sheets of half letter size paper.

If the margin left in the recording sheet is compared between when the image data is printed on the single sheet of legal size paper and when the image data is printed on the two sheets of half letter size paper, the latter has a smaller margin. In other words, printing the image data on the two sheets of half letter size paper reduces wasted paper.

Therefore, after the print types of all the paper cassettes are decided, the print type "1-PAGE" should be considered if the print type "HALF-PAGE" is available.

(D) LONG-PAGE VS. REDUCED-JUST-1-PAGE, REDUCED-1-PAGE, REDUCED-JUST-HALF-PAGE AND REDUCED-HALF-PAGE

This has a different concept than the above described (A) to (C). Specifically, (A) to (C) are designed to reduce wasted paper, but (D) aims to prevent image data from being printed on a plurality of recording sheets. Image data is printed on a plurality of recording sheets so long as the print type of the paper cassette is "LONG-PAGE" and recording sheets are fed from that paper cassette if a 100% magnification preferred mode is selected.

However, even in the 100% magnification preferred mode, a user may want to have the image data printed on a single sheet of paper.

In order to prevent the image data from being printed on a plurality of recording sheets in the 100% magnification preferred mode, the print types REDUCED-JUST-1-PAGE, REDUCED-1-PAGE, REDUCED-JUST-HALF-PAGE and REDUCED-HALF-PAGE are considered after the print types of all the paper cassettes are decided if the print type LONG-PAGE is available.

In other words, even if the 100% magnification preferred mode is selected, the order of priority of LONG-PAGE is lowered to avoid the multiple-page printing. Specifically, the order of preference of LONG-PAGE is shifted to between REDUCED-JUST-1-PAGE and REDUCED-PAGE in the 100% magnification preferred mode shown in FIG. 6A.

Cassette Selection:

Next, the operation of the facsimile machine 1 to select a paper cassette when printing image data will be described in reference to flowcharts shown in FIGS. 14 to 16. The control depicted in these flowcharts are executed by MPU 10 according to the programs stored in ROM 20. The table T shown in FIG. 7 is stored in RAM 30. It should be assumed that either the 100% magnification preferred mode or the one-page-printing preferred mode is selected upon operations on the control panel 65.

Figure 14:
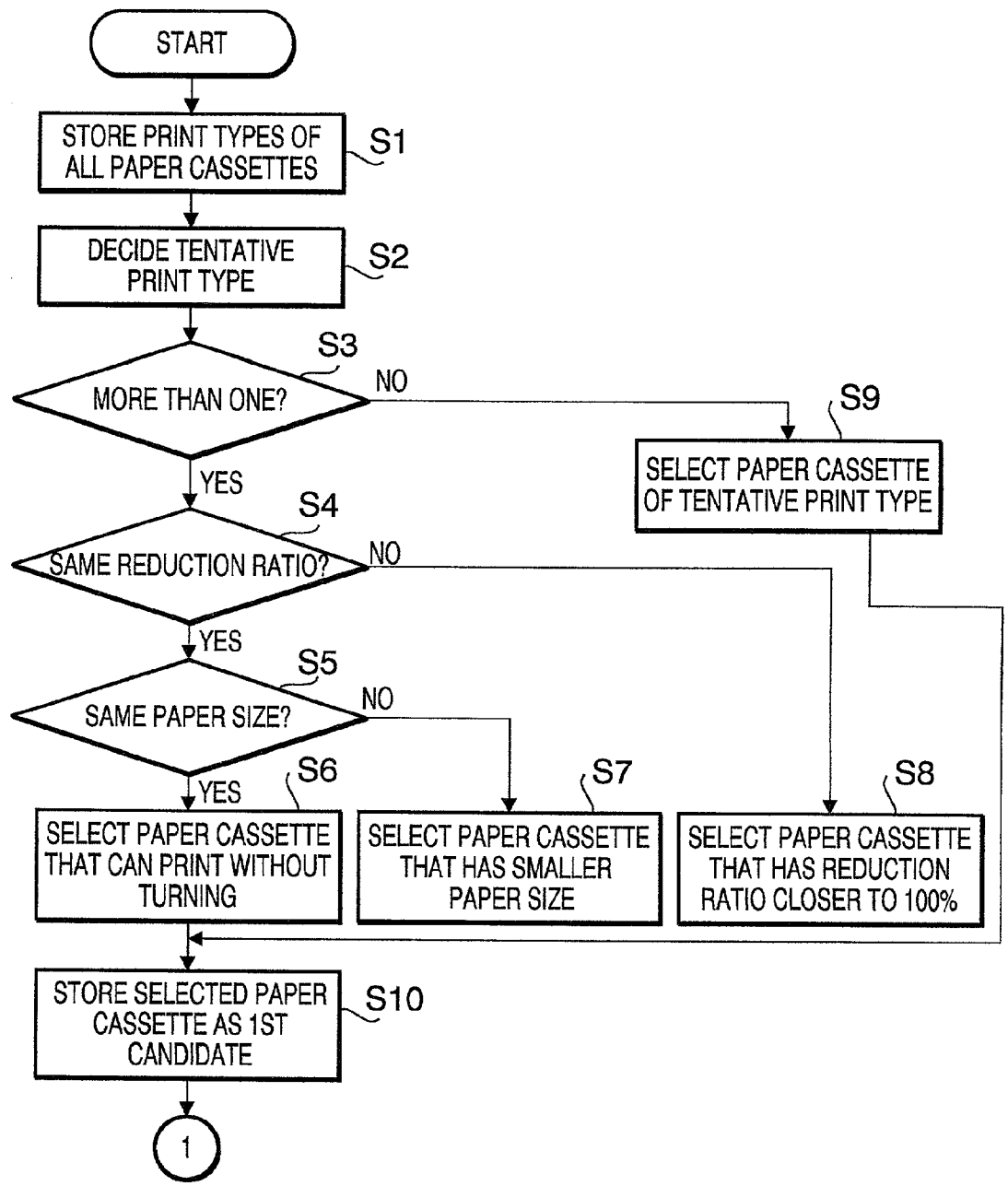

Referring to FIG. 14, print types of all the paper cassettes (first to third paper cassettes) 51 to 53 are determined and stored in RAM 30 at Step S1. Thus, it is determined which one of the above described print types (1) through (12) the first, second and third cassettes 51, 52 and 53 respectively have when the image data is printed on one or more recording sheets at 100% magnification or a reduced scale. In this determination, the print types listed in FIG. 6A (in the case of 100% magnification preferred mode) or FIG. 6B (in the case of one-page-printing preferred mode) are checked from the highest priority one. The print types decided for the paper cassettes 51 to 53 are then stored RAM 30 as mentioned earlier. For example, the print type of the first paper cassette 51 is determined to be JUST-1-PAGE, that of the second paper cassette 52 is SEMI-JUST-HALF-PAGE and that of the third paper cassette 53 is JUST-HALF-PAGE, and these print type information is stored in RAM 30.

At Step 2, the print type having the highest priority among those of the first to third paper cassettes 51 to 53 is chosen as a tentative print type. Specifically, if the 100% magnification preferred mode is selected, the print type of highest priority is chosen as the tentative print tyep based on the order of priority shown in FIG. 6A, and if the one-page-printing preferred mode is selected, the print type of highest priority is chosen based on the preference order list shown in FIG. 6B.

At Step 3, it is determined whether there are more than one tentative print type. Specifically, it is determined whether two or more cassettes have the same highest priority print type decided at Step S2. If the answer is yes, the program proceeds to Step S4. On the other hand, if there is only one tentative print type, the program proceeds to Step S9.

At Step S4, it is determined whether the reduction ratios of the tentative print types are the same. This is a case where at least two of the first to third paper cassettes 51 to 53 store recording sheets of similar size. For example, the first paper cassette 51 stores A4 size sheets and the second paper cassette 52 stores letter size sheets, and the print type of each of the paper cassettes 51 and 52 is JUST-1-PAGE. If the reduction ratios of these cassettes are the same, the program proceeds to Step S5. If not, the program proceeds to Step S8.

At Step S5, it is determined whether the paper sizes of the paper cassettes are the same. If the answer is positive, the program proceeds to Step S6. If the answer is negative, the program proceeds to Step S7.

At Step S6, one of the paper cassettes that stores recording sheets capable of printing the image data without turning the image data is selected. Even if the same sheets are stored in the paper cassettes, the directions of paper may differ from each other. For instance, the first paper cassette 51 stores the A4 size paper lengthwise and the second paper cassette 52 stores the A4 size paper breadthwise. Thus, the paper cassette which does not require the image data to be turned is selected.

At Step S7, one of the paper cassettes that stores sheets of the smallest size is selected. In other words, the paper cassette that stores sheets which leave the smallest margin is selected. It should be noted that the paper size can be construed as an effective area on a sheet for printing of an image. If the page synthesis mode is selected and page synthesis is carried out, a half of the recording sheet is the sheet size or effective area. When the received image data has a width equal to the short side of A4 size paper and a length shorter than the long side of A4 size paper, and the first paper cassette 51 holds sheets of B4 size and the second paper cassette 52 holds sheets of A4 size, then both of the first and second paper cassettes can be selected since the image data can be printed at 100% magnification. In this case, the print type of the first paper cassette 51 is 1-PAGE and that of the second paper cassette 52 is also 1-PAGE. Thus, the second paper cassette 52 holding the smaller size sheets (i.e., A4 size) is selected.

At Step S8, one of the paper cassettes that holds recording sheets capable of printing image data at a magnification closest to 100% is selected. This is because the printed image is close to the original image if the reduction ratio is close to 100%. If the received image data has A3 size, the first paper cassette 51 holds B4 size paper and the second paper cassette holds A4 size paper, the A3 size original image can be printed on the B4 size paper at the reduction ratio of 86% and on the A4 size paper at the reduction ratio of 70%. The print type of the first paper cassette 51 is REDUCED-JUST-1-PAGE and that of the second paper cassette 52 is the same. In such a case, the first paper cassette 51 is selected since its reduction ratio (86%) is closer to 100%.

At Step S9, since there is only one tentative print type, a paper cassette having that print type is selected.

At Step S10, the paper cassette selected at Step S6, S7, S8 or S9 is stored in RAM 30 as the primary candidate.

The program advances to Step 11 (FIG. 15) after Step S10.

At Step S11, it is determined whether there is any comparative print type corresponding to the tentative print type decided at Step S2 (FIG. 14) in the table T shown in FIG. 7. If the answer is yes, the program proceeds to Step S 12. If no, the program proceeds to Step S32 (FIG. 16).

At Step S12, the comparative print type is read out of the table T.

At Step S13, it is determined whether there are more than one comparative print type. If there are a plurality of comparative print types, the program proceeds to Step S14. Otherwise, i.e., if there is only one print type for comparison, the program proceeds to Step S19.

At Step S14, it is determined whether the reduction ratios are the same. If yes, the program proceeds to Step S15. If no, the program proceeds to Step S18.

At Step S15, it is determined whether the paper sizes are the same. If yes, the program proceeds to Step S16. Otherwise, the program proceeds to Step S17.

At Step S16, a paper cassette that can print image data on a recording sheet without turning the image data is selected. If the received image data has a width equal to the short side of B4 size and a length longer than the long side of B4 size, the first paper cassette 51 holds B4 size sheets, the second paper cassette 52 holds A4 size lengthwise and the third paper cassette 53 holds A4 size breadthwise, then the print type of the first paper cassette 51 is LONG-PAGE, that of the second paper cassette 52 is REDUCED-1-PAGE and that of the third paper cassette 53 is also REDUCED-1-PAGE. It should be noted that if the received image data is slightly longer than a predetermined size and should be reduced for printing, the print type is determined to be REDUCED-1-PAGE in this embodiment. Since the print type of the first paper cassette 51, i.e., LONG-PAGE, is the tentative print type in the table T shown in FIG. 7, the print type for comparison REDUCED-1-PAGE, which is the print type of the second and third paper cassettes 52 and 53, is considered. However, it should be remembered that the second and third paper cassettes 52 and 53 hold the sheets of same size. Accordingly, the third paper cassette 53 holding the A4 size breadthwise is selected since it can print the image without turning the image data.

At Step S17, a paper cassette that holds sheets of smaller size is selected. In other words, a paper cassette that holds sheets which leave a smaller margin is selected. If the received image data has a width equal to the letter size and a length shorter than the letter size by 11 cm, the first paper cassette 51 holds legal size sheets, the second paper cassette 52 holds A4 size sheets and the third paper cassette 53 holds letter size sheets, the print type of the first cassette 51 is SEMI-JUST-HALF-PAGE, that of the second paper cassette 52 is SEMI-JUST-1-PAGE and that of the third paper cassette 53 is also SEMI-JUST-1-PAGE. Since the print type of the first paper cassette 51 is the tentative print type shown in the table T, the print type for comparison SEMI-JUST-1-PAGE of the second and third paper cassettes 52 and 53 should be examined. It should be noted, however, that both the second and third paper cassettes 52 and 53 can print the image data at 100% magnification. Thus, the third paper cassette 53 is selected since its recording sheet size (letter size) is smaller.

At Step S18, a paper cassette that can print the image at a magnification closer to 100% is selected. If the received image data is of B4 size, the first paper cassette 51 holds B5 size sheets lengthwise, the second paper cassette 52 holds A4 size sheets and the third paper cassette 53 holds A5 size sheets, the print type of the first paper cassette 51 is LONG-PAGE, that of the second paper cassette 52 is REDUCED-1-PAGE and that of the third paper cassette 53 is also REDUCED-1-PAGE. Because the print type of the first paper cassette 51, LONG-PAGE, is the tentative print type shown in the table T of FIG. 7, the print type of the second and third paper cassettes, REDUCED-1-PAGE, should be examined. Both the second and third paper cassettes 52 and 53 can print the received image data if the image is reduced. Thus, the second paper cassette 52 holding A4 size paper is selected since its reduction ratio is closer to 100%.

At Step S19, since there is only one comparative print type, a paper cassette having that print type is selected.

At Step S20, the paper cassette selected at Step S16, S17, S18 or S19 is stored in RAM 30 as the second candidate.

The program proceeds to Step S31 (FIG. 16) from S20.

At Step 31 in the flowchart of FIG. 16, the paper cassette of the first candidate (Step S10 in FIG. 14) is compared with that of the second candidate (Step 20 in FIG. 15) to determine which holds smaller size sheets. The paper cassette having the smaller size sheets is selected as an ultimate paper cassette.

When the answer at Step S11 is negative (FIG. 15), the program proceeds to Step S32 (FIG. 16). The answer at Step S11 is negative when no print type in the table T corresponds to the tentative print type, or when the print type for comparison does not match any of the print types of the first to third paper cassettes 51 to 53. In short, there is no second candidate. Therefore, the paper cassette of the first candidate is selected as the ultimate paper cassette.

At Step S33, the image data is printed on a sheet fed from the paper cassette decided at Step S31 or S32.

As described above, the present invention has the following advantages.

1) If there are a plurality of paper cassettes having the same print type, i.e., there are a plurality of paper cassettes having the same level of priority, one of the paper cassettes that has a reduction ratio closest to 100% is selected. Therefore, the image is reproduced at the receiving side as close to the original image as possible. In other words, the sameness between the original image and the reproduced image is ensured as much as possible. Thus, the best-suited recording paper can be selected.

2) In addition, when the reduction ratios of the paper cassettes are the same, a paper cassette that holds sheets of smaller size is selected. Accordingly, a margin to be left on the recording sheet is reduced. This also contributes to the most appropriate sheet selection.

3) Moreover, if the paper cassettes hold the sheets of same size, the one that can print the image without turning is selected. Consequently, it is unnecessary to turn the image data. This contributes to not only the best sheet selection but also the prompt printing.

4) The consideration table T is stored in RAM 30 as shown in FIG. 7. If the tentative print type of a paper cassette selected as the first candidate matches a tentative print type listed in the consideration table T, a print type is sought for as the comparative print type, and the paper cassette of second candidate is selected. Then, the first candidate is compared with the second candidate, and the one having sheets of smaller size is selected as the ultimate paper cassette. By considering two candidates, much better sheet selection can be expected.

5) The 100% magnification preferred mode and the one-page-printing preferred mode are available, and the operator can select one of them arbitrarily. Therefore, the operator can determine a suitable mode.

Figure 15:
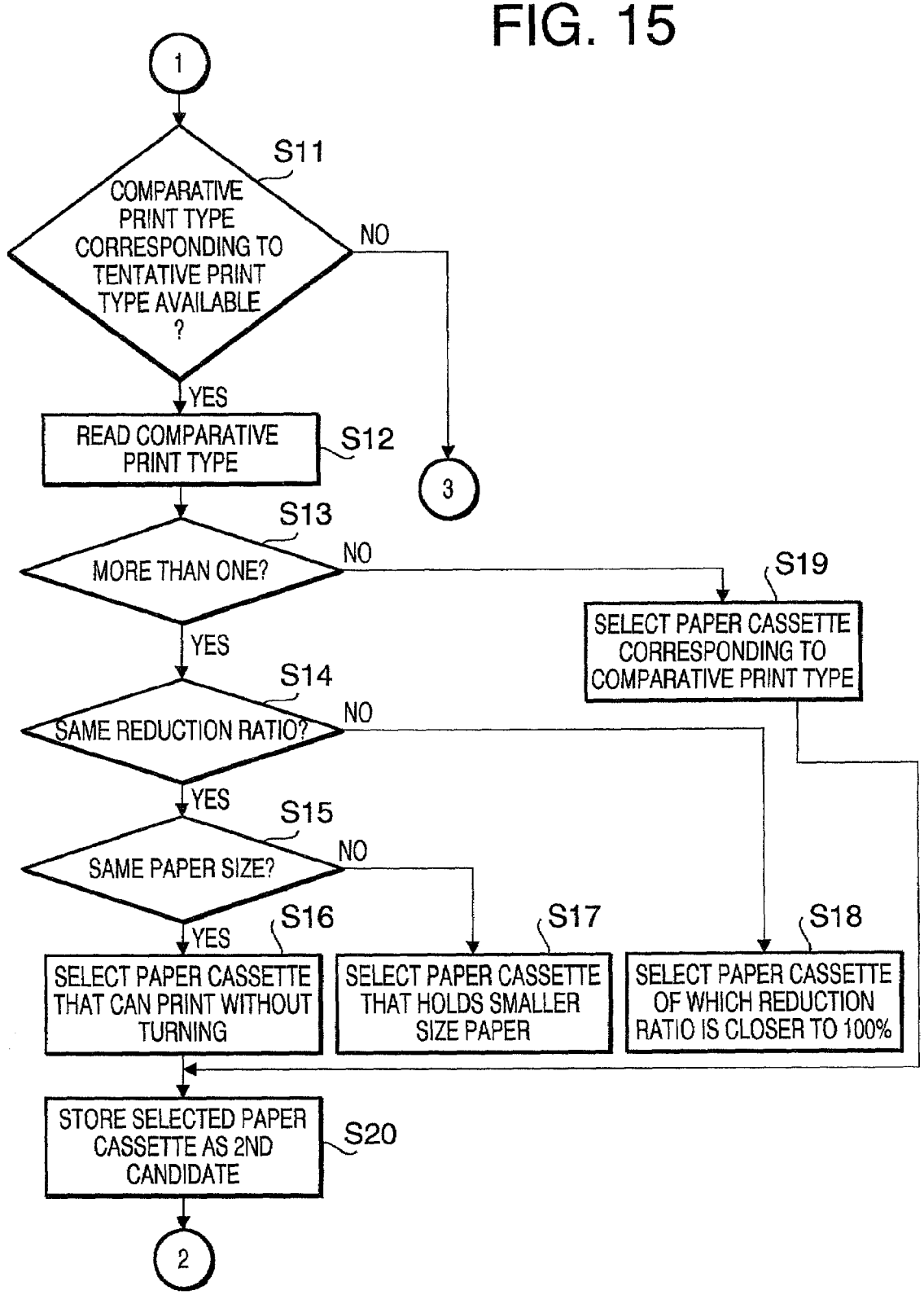

6) The first and second candidates are selected in a similar manner (FIGS. 14 and 15). If the paper cassette selection is conducted by a program, a single program can be commonly utilized for both the first and second candidates by means of a subroutine.

It should be noted that the present invention is not limited to the illustrated and described embodiments. Various modifications and changes which can be made without departing from the sprint and scope of the present invention will be described below.

(1) If the print types to be compared have the same level of priority, a paper cassette that holds recording sheets of narrower width may be selected. Specifically, if the first to third paper cassettes 51 to 53 hold the recording sheets of similar (or substantially the same) size, e.g., if the first cassette 51 holds A4 size paper and the second cassette 52 holds letter size paper, and the print type of both the first and second paper cassettes 51 and 52 is JUST-1-PAGE, a paper cassette holding the narrower sheets is selected. This reduces a margin to be left on a recording sheet.

(2) Although the embodiments deal with image data received from a remote machine, the image data may be that scanned by the scanner 40 during a photocopy operation.

(3) The page synthesis mode may combine more than two pages of image data and print it on a single sheet of paper.

(4) The facsimile machine 1 may also have a user-defined mode in addition to the 100% magnification preferred mode and the one-page-printing preferred mode. This allows the user to arbitrarily determine the order of priority with respect to the print type.

What is claimed is:

1. An image forming apparatus for printing one or more images on one or more recording sheets supplied from a particular paper cassette comprising:
   a plurality of paper cassettes for storing recording sheets of different sizes respectively;
   at least one first memory table for memorizing a plurality of print types in a predetermined order from a highest priority to a lowest priority, wherein the plurality of print types are prioritized based on a selected printing mode;
   a second memory table for memorizing a plurality of comparative print types which are to be compared with the plurality of print types respectively; and
   a controller for selecting a first paper cassette from the plurality of paper cassettes that stores recording sheets suited to print an image and has a print type of possible highest priority in the respective first memory table, for selecting a second paper cassette from the plurality of paper cassettes that stores recording sheets suited to print the image and has a comparative print type to be compared with the print type of the first paper cassette in the second memory table, and for selecting one of the first and second paper cassettes based on a predetermined criterion of paper waste reduction as an ultimate paper cassette.

2. The image forming apparatus of claim 1, wherein the at least one first memory table includes a memory table prepared for a first printing mode adapted to preferably print the image at 100% magnification and another memory table prepared for a second printing mode adapted to preforably print the image on a single recording sheet.

3. The image forming apparatus of claim 1, wherein the predetermined criterion is to select a paper cassette that stores recording sheets of smallest size.

4. The image forming apparatus of claim 1, wherein if there are more than one first paper cassette, the controller selects a paper cassette that can print the image at a reduction ratio closest to 100%, and if there are more than one second paper cassette, the controller selects a paper cassette that can print the image at a reduction ratio closest to 100%.

5. The image forming apparatus of claim 4, wherein if the reduction ratios of the respective first paper cassettes are the same, the controller selects a paper cassette that stores recording sheets of smallest size, and if the reduction ratios of the respective second paper cassettes are the same, the controller selects a paper cassette that stores recording sheets of smallest size.

6. The image forming apparatus of claim 5, wherein if the paper sizes of the respective first paper cassettes are the same, the controller selects a paper cassette that can print the image without turning the image, and if the paper sizes of the respective second paper cassettes are the same, the controller selects a paper cassette that can print the image without turning the image.

7. The image forming apparatus of claim 1, wherein the controller selects a paper cassette that leaves a smallest margin on the recording sheet upon printing the image when it selects the first and second paper cassettes from the first and second memory tables respectively.

8. The image forming apparatus of claim 1, wherein if there are more than one first paper cassette, the controller selects a paper cassette that stores recording sheets of smallest width, and if there are morn than one second paper cassette, the controller selects a paper cassette that stores recording sheets of smallest width.

9. The image forming apparatus of claim 1, wherein if there are more than one first paper cassette, the controller selects a paper cassette that can print the image in a single recording sheet even if a 100% magnification preferred mode is selected, and if there are more than one second paper cassette, the controller selects a paper cassette that can print the image in a single recording sheet even if a 100% magnification preferred mode is selected.

10. The image forming apparatus of claim 1, wherein if there is no comparative print type in the second memory table, the controller selects the first paper cassette as the ultimate paper cassette.

11. The image forming apparatus of claim 1, wherein:
    the plurality of print types comprise JUST-1-PAGE, JUST-HALF-PAGE, SEMI-JUST-1-PAGE, SEMI-JUST-HALF-PAGE, HALF-PAGE. 1-PAGE, LONG-PAGE, REDUCED-JUST-1-PAGE, REDUCED-1-PAGE, REDUCED-JUST-HALF-PAGE, REDUCED-HALF-PAGE and REDUCED-PAGE; and
    the selected printing mode is either 100% magnification preferred mode or one-page-printing preferred mode.

12. A method of printing one or more images on one or more recording sheets supplied from a particular paper cassette comprising the steps of:
    A) providing a plurality of paper cassettes to store recording sheets of different sizes;
    B) providing at least one first memory table to memorize a plurality of print types in a predetermined order from a highest priority to a lowest priority, wherein the plurality of print types are prioritized based on a selected printing mode;

C) providing a second memory table to memorize a plurality of comparative print types;
D) selecting a first paper cassette from the plurality of paper cassettes that stores recording sheets suited to print an image and has a print type of possible highest priority in the respective first memory table;
E) selecting a second paper cassette from the plurality of paper cassettes that stores recording sheets suited to print the image and has a comparative print type to be compared with the print type of the first paper cassette in the second memory table;
F) selecting one of the first and second paper cassettes based on a predetermined criterion of paper waste reduction as an ultimate paper cassette; and
G) printing the image on one or more recording sheets supplied from the ultimate paper cassette.

13. The method of printing according to claim 12, wherein the at least one first memory table includes a memory table prepared for a first printing mode adapted to preferably print the image at 100% magnification and another memory table prepared for a second printing mode adapted to preferably print the image on a single recording sheet.

14. The method of printing according to claim 12, wherein the predetermined criterion is to select a paper cassette that stores recording sheets of smaller size.

15. The method of printing according to claim 12, wherein if there are more than one first paper cassette, the step D selects a paper cassette that can print the image at a reduction ratio closest to 100%, and if there are more than one second paper cassette, the step E selects a paper cassette that can print the image at a reduction ratio closest to 100%.

16. The method of printing according to claim 15, wherein if the reduction ratios of the respective first paper cassettes are the same, the step D selects a paper cassette that stores recording sheets of smallest Size, and if the reduction ratios of the respective second paper cassettes are the same, the step E selects a paper cassette that stores recording sheets of smallest size.

17. The method of printing according to claim 16, wherein if the paper sizes of the respective first paper cassettes are the same, the step D selects a paper cassette that can print the image without turning the image, and if the paper sizes of the respective second paper cassettes are the same, the step E selects a paper cassette that can print the image without turning the image.

18. The method of printing according to claim 12, wherein the step D selects a paper cassette that leaves a smallest margin on the recording sheet upon printing the image when it selects the first paper cassette from the first memory table and the step E selects a paper cassette that leaves a smallest margin on the recording sheet upon printing the image when it selects the second paper cassette from the second memory table.

19. The method of printing according to claim 12, wherein if there are more than one first paper cassette, the step D selects a paper cassette that stores recording sheets of smallest width, and if there are more than one second paper cassette, the step E selects a paper cassette that stores recording sheets of smallest width.

20. The method of printing according to claim 12, wherein if there are more than one first paper cassette, the step D selects a paper cassette that can print the image in a single recording sheet even if a 100% magnification preferred mode is selected, and if there are more than one second paper cassette, the step E selects a paper cassette that can print the image in a single recording sheet even if a 100% magnification preferred mode is selected.

21. The method of printing according to claim 12, wherein if there is no comparative print type, the step F selects the first paper cassette as the ultimate paper cassette.

22. The method of printing according to claim 12, wherein;
the plurality of print types comprise JUST-1-PAGE, JUST-HALF-PAGE, SEMI-JUST-1-PAGE, SEMI-JUST-HALF-PAGE, HALF-PAGE, 1-PAGE, LONG-PAGE, REDUCED-JUST-1-PAGE, REDUCED-1-PAGE, REDUCED-JUST-HALF-PAGE, REDUCED-HALF-PAGE and REDUCED-PAGE; and
the selected printing mode is either 100% magnification preferred mode or one-page-printing preferred mode.

23. An apparatus for printing one or more images on one or more recording sheets supplied from a particular paper cassette comprising:
a plurality of first means for storing recording sheets of different sizes respectively;
second means for memorizing a plurality of print types in a predetermined order from a highest priority to a lowest priority, wherein the plurality of print types are prioritized based on a selected orating mode;
third means for memorizing a plurality of comparative print types; and
fourth means for selecting one first means from the plurality of first means that stores recording sheets suited to print an image and has a print type of possible highest priority in the second means;
fifth means for selecting another first means from the plurality of first means that stores recording sheets suited to print the image and has a comparative print type to be compared with the print type of the one first means in the third means;
sixth means for selecting one of the one and another first means based on a predetermined criterion of paper waste reduction as an ultimate first means; and
seventh means for printing the image on one or more recording sheets supplied from the ultimate first means.

* * * * *